United States Patent [19]
Ehlert

[11] 3,891,238
[45] June 24, 1975

[54] TRAILER HITCH

[76] Inventor: Elmer R. Ehlert, 308 Independence, Pella, Iowa 50219

[22] Filed: Feb. 6, 1974

[21] Appl. No.: 439,897

[52] U.S. Cl............... 280/446 R; 280/477; 280/499
[51] Int. Cl............................................. B62d 53/00
[58] Field of Search..................... 280/446, 447, 499

[56] References Cited
UNITED STATES PATENTS

| | | | |
|---|---|---|---|
| 3,353,842 | 11/1967 | Lewis | 280/406 A X |
| 3,601,427 | 8/1971 | Holt | 280/447 X |

FOREIGN PATENTS OR APPLICATIONS

| | | | |
|---|---|---|---|
| 595,652 | 7/1925 | France | 280/446 R |

*Primary Examiner*—Leo Friaglia
*Attorney, Agent, or Firm*—Morton S. Adler

[57] ABSTRACT

A hitch apparatus is provided on a towing vehicle for coupling with boat and house trailers and the like and includes a preferably square or rectangular support frame for attachment to the rear underside frame portion of the towing vehicle. An elongated tongue or arm is telescopically journalled at its forward end in a support sleeve that is pivotally supported by the hitch frame at a lateral central point on the towing vehicle just rearwardly of the rear axle thereon. The tongue normally extends rearwardly in alignment with the longitudinal center line of the vehicle and projects beyond such vehicle at the rear below the conventional bumper where it is provided with a hitch ball or tube or both for coupling with a trailer. Forwardly of the hitch ball, or tube if used, the tongue is pivotally anchored to a collar laterally slidable on a shaft mounted to the hitch frame so that in a turn, the tongue can move away from center at either side thereof a predetermined distance. Such movement away from center is limited by spring loaded stops releasable when the towing vehicle comes out of the turn so the tongue can return to a central position. The hitch assembly at the point of the hitch ball or tube is further capable of pivotal movement at the stop point to provide better maneuverability in tight places. The tongue assembly maintains a direct line of pull from the towing vehicle to the towed vehicle either on a straightaway or in a turn.

5 Claims, 7 Drawing Figures

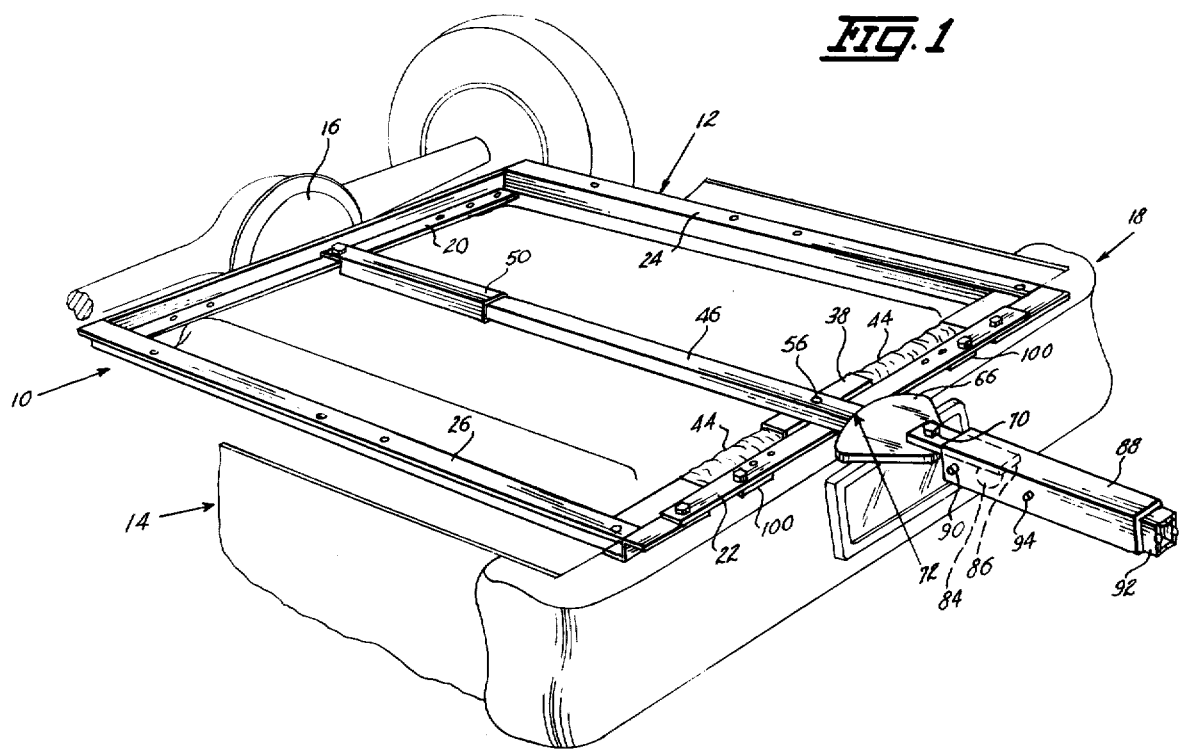

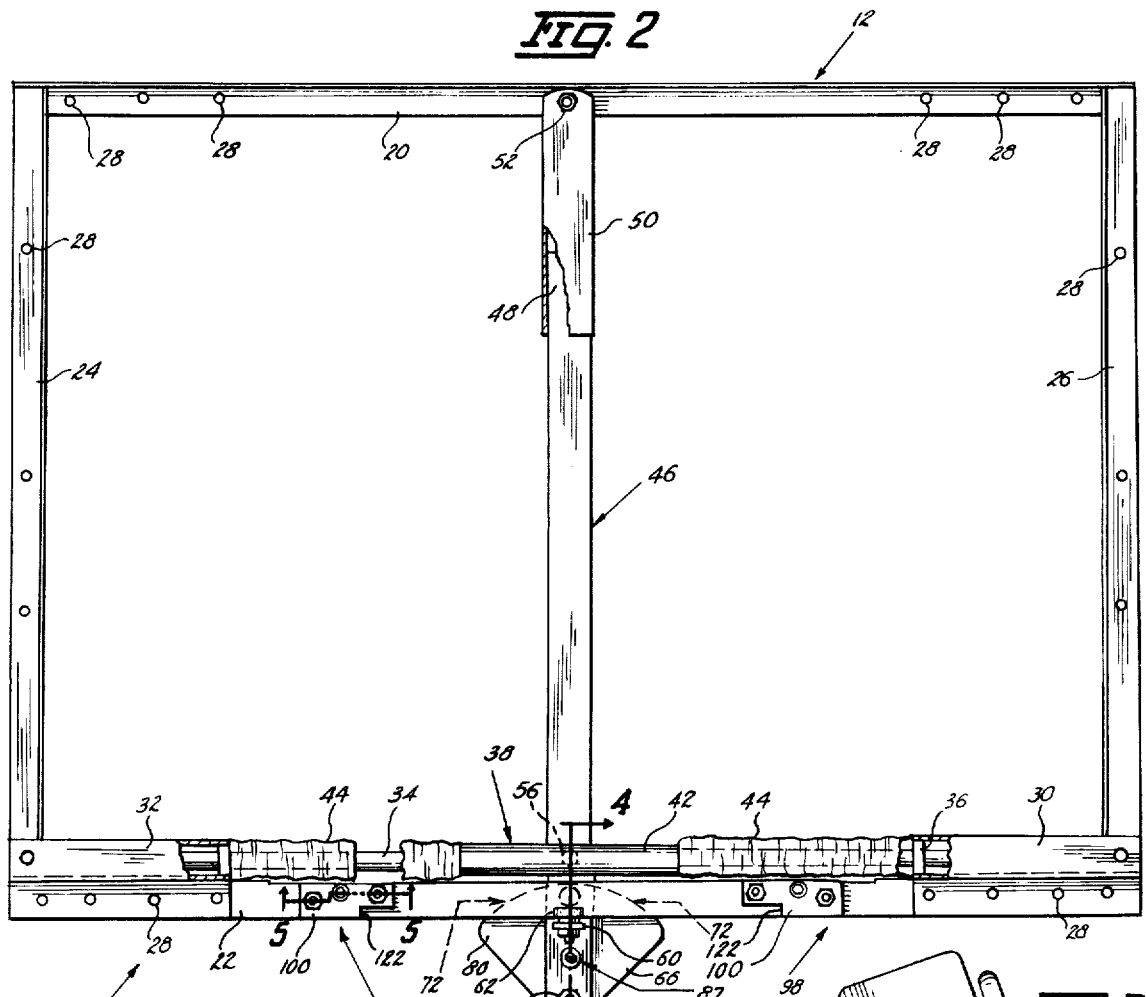
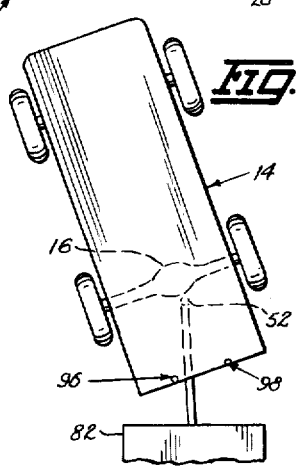
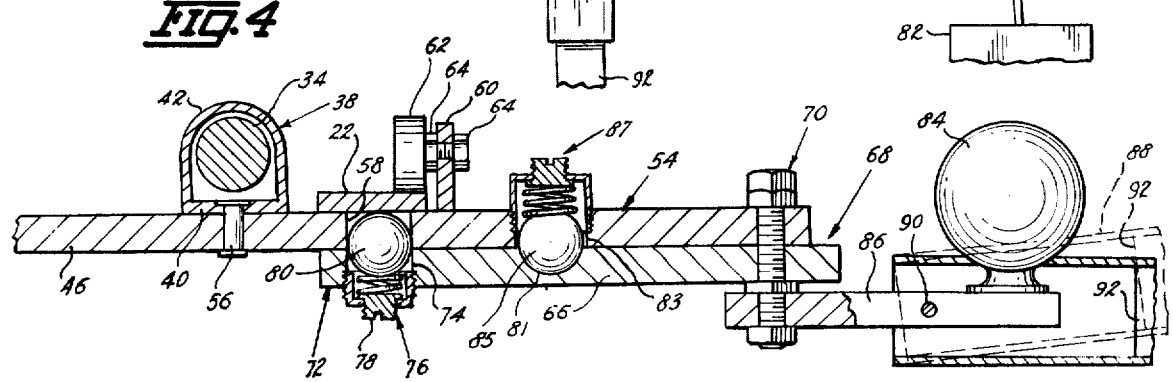

TRAILER HITCH

BACKGROUND OF THE INVENTION

This invention relates to improvements in hitches on a towing vehicle for coupling with a boat or house trailer or the like unit to be towed.

Conventionally, in a hitch device on a towing vehicle, the point of coupling, be it a ball or tube, is fixedly and immovably anchored centrally of the width of the towing vehicle at the rear so that at all times of travel, whether on a straight-away or in a turn, the force of pull is centered at the rear of the towing vehicle. This, of course, is desirable in maintaining a straight line of pulling forces on the straightaway but results in curved lines of pull in turns where the towed unit moves out of direct alignment in the direction of turning but remains pivotally coupled to the centrally located hitch so that it is, in effect, angularly positioned relative to the towing vehicle and in this position, is more vulnerable to the possibility of fish-tailing particularly if subjected to wind pressures from passing vehicles or otherwise. This appears to be due in part at least by the fact that when the front of the towing vehicle turns in one direction, the conventional centrally located hitch point at the rear of the vehicle moves on a radius in the opposite direction so as to correspondingly move the hitched trailer at that point while at the same time, the trailer wheels are following the direction of turn of the towing vehicle. As a result, in this position, the trailer tongue is angularly disposed to alignment longitudinally of the pulling force from the towing vehicle so that it can be appreciated a curved angle of pull exists between the two vehicles.

With the above observations in mind, it is one of the important objects of this invention to provide a trailer hitch which maintains a direct line of pulling force between the towing and towed vehicles irrespective of whether the direction of travel is on a straightaway or in a turn.

More particularly, in a trailer hitch of the above class, it is an object herein to provide a hitch assembly having a frame for attachment to the towing vehicle and which includes an elongated tongue telescopically journalled at its forward end to a support sleeve pivotally mounted to the frame at the lateral center of the towing vehicle just rearwardly of the rear axle thereon and which extends rearwardly therefrom to a normal central position at the rear of the vehicle where it is provided with hitching means for the vehicle to be towed. Further, in this regard, it is provided that the tongue is pivotally anchored at the rear portion of the towing vehicle to a collar laterally slidable on a frame supported shaft so that the tongue is movable to right or left of the center longitudinal line of the towing vehicle to correspondingly move the hitching means for the trailer and thus maintain a direct line of pulling force to the towed vehicle.

A further object herein is to provide a trailer hitch as characterized which includes spring loaded releasable stops at each side of the rear center of the towing vehicle to limit the off-center alignment of the tongue.

Still another object is to provide in a hitch of the above class for a separate and additional pivotal movement of the hitching means at the stop point of the tongue as a means of affording better manueverability in close quarters, if required.

Further objects are to provide an improved trailer hitch that is extremely sturdy, highly efficient, minimizes the possibility of trailer sway or fish-tailing and increases the safety in pulling a towed vehicle.

The foregoing objects and such further objects as may appear herein, or be hereinafter pointed out, together with the advantages of this invention, will be more fully discussed and developed in the more detailed description of the accompanying drawings.

BRIEF DESCRIPTION OF THE DRAWINGS

FIG. 1 is an inverted perspective view of this hitch shown mounted to the underside rear frame portion of a towing vehicle, FIG. 2 is a top plan view of this invention, FIG. 3 is a fragmentary top plan view showing the trailer hitch point assembly in solid lines moved to a point left of center of the towing vehicle and in broken lines, moved to a point right of center of the towing vehicle, FIG. 4 is a cross sectional view taken from the line 4—4 of FIG. 2, FIG. 5 is a cross sectional view taken from the line 5—5 of FIG. 2, FIG. 6 is a cross sectional view taken from the line 6—6 of FIG. 3, and FIG. 7 is a schematic view of a towing vehicle and portion of a trailer to illustrate the relative position of this new trailer hitch in a turning position.

DESCRIPTION OF THE PREFERRED EMBODIMENTS

Referring to the drawings, this new trailer hitch is designated generally by the numeral 10 (FIG. 2) and includes a relatively large and rigid frame 12 preferably made of steel and generally square in outline which, as will later be referred to in more detail, is mounted to the underside rear portion of a towing vehicle represented only in part as at 14 so as to extend from a point just rearwardly of the rear axle 16 on vehicle 14 to the rear body extremity line 18 as seen in FIG. 1.

Frame 12 comprises front 20 and rear 22 parallel spaced rails or bars and parallel spaced side rails or bars 24 and 26 secured respectively in any suitable manner to rails 20 and 22 to form the substantially square and rigid frame 12. Holes 28 spaced in the several rails as shown are merely a convenience for providing a plurality of points of attachment for accommodation to different vehicle frame arrangements when attaching hitch 10 thereto. If desired, corner bracing (not shown) can be provided for frame 10 but when such frame is secured to the vehicle 14, this will not generally be required.

At the rear of frame 12 and at respective opposite sides just forwardly of the rear rail 22 and in juxtaposition therewith are the respective housings 30 and 32, housing 30 being suitably secured to side rail 26 and rear rail 22 and housing 32 being suitably secured to side rail 24 and rear rail 22 so that their longitudinal axes are parallel to the rear rail 22. An elongated shaft 34 has its respective opposite ends disposed respectively in housings 30 and 32 for which appropriate bearings 36 are provided and at the longitudinal central portion of shaft 34, there is slidably mounted thereon the elongated collar 38 which preferably has a flat bottom 40 and an arcuate top 42 (FIG. 4). The respective opposite ends of collar 38 are in spaced relationship to the respective opposing ends of housings 30 and 32 which would normally leave the shaft 34 in such areas exposed to dirt and grime and thus to protect shaft 34 in this regard, suitable flexible bellow type coverings 44 are placed on shaft 34 as shown in FIG. 2.

An elongated rigid tongue or arm 46 has its forward end 48 telescopically journalled in the rear end of an elongated support sleeve 50 which, at its forward end, is pivotally secured as at 52 to the forward rail 20 at the substantially center point intermediate side rails 24 and 26 and which as seen in FIG. 1, is just rearwardly of the axle 16. As seen in FIG. 2 which is the normal position of hitch 10 in straightaway travel, tongue 46 extends from sleeve 50 rearwardly and parallel to side rails 24 and 26 to pass transversely under and in abutment with collar 38 on shaft 34 and transversely under and in abutment with rear rail 22 to extend rearwardly of rail 22 in defining its rear extension or projection 54. As best seen in FIG. 4, tongue 46 is pivotally anchored or secured to the bottom 40 of collar 38 by a strong pin 56 and at a point where it traverses the rear rail 22, it is provided with the through opening or hole 58. On tongue projection 54 just rearwardly of hole 58 (FIG. 4), there is mounted an upstanding apertured ear 60 which supports a roller wheel 62 disposed to engage and move longitudinally on the rear upper edge portion of rail 22, the axle of such wheel 62 extending through ear 60 with mounting nuts 64 at each side thereof.

A rigid plate preferably in the shape of a sector 66 is disposed beneath the tongue 46 extension 54 and has its trailing or apex end 68 pivotally attached to the projected extremity of member 54 as by the nut and bolt assembly 70 so that at least a part of its leading or radius edge portion 72 is vertically below the rear rail 22 in different positions as best seen in FIGS. 2 and 6 and which will be more fully referred to as this description proceeds. On the top surface of plate 66 near edge 72 and central of the extremities of such edge there is provided the recess, well or socket 74 to approximately one-half of the depth of such plate. Communicating with the bottom of socket 74 from the bottom side of plate 66 is the spring loaded fitting 76 having the projecting kerfed end 78 whereby the compression on the spring component can be selectively tightened or loosened in an obvious manner. Socket 74, in the straightaway position of travel shown in FIG. 2, is in register with hole 58 in tongue 46 and a steel ball 80 seated in socket 74 is also extended into hole 58 where it abuts the underside of the rear rail 22 and is urged against the same by the fitting 76 (FIG. 4) so that ball 80 is engaged with both tongue 46 and plate 66 to lock such members against relative movement for straightaway travel of vehicle 14. To supplement the holding effect of such locking arrangement for straightaway travel in the event of unexpected side sway of the trailer, I preferably provide portion 54 of tongue 46 with a dished recess 81 in alignment with hole 58 and spaced rearwardly therefrom as seen in FIG. 4. Correspondingly, portion 54 of tongue 46 is provided with a through opening 83 for registration with recess 81. A steel ball 85 normally seated in recess 81 and opening 83 for locking plate 66 to tongue portion 54 is yieldingly held in place by the spring loaded fitting 87 on the top of portion 54 in a manner similar to fitting 76. By this arrangement, the cooperative locking action of both balls 80 and 85 assures the maintaining of the locked positions of members 46 and 66 during straightaway travel.

The rear projection 54 of tongue 46 carries means for the actual point of hitch attachment of a trailer represented only in part as at 82 (FIG. 7) as follows. A ball hitch member 84 is suitably secured to one end of a short bar 86 for which the other end is apertured and mounted below end 68 of plate 66 by means of the bolt and nut assembly 70. Ball hitch 84 may, of course, be of different sizes as is well known for accepting any conventional complementary ball hitch coupling that may be on a trailer 82 but since in some instances and especially with heavier type trailers where tubular hitch components are utilized, I have also provided for such conditions by including an elongated housing 88 suitably secured to bar 86 as by pin 90 and extending rearwardly of ball 84 where it can receive a tongue member 92 from the towed vehicle to be removably secured by a pin 94. It will be understood that the ball hitch 84 and the tubular housing hitch 88 may be used separately and that I merely provide both as a matter of convenience to accommodate the particular type of trailer hitch assembly that might be encountered. Thus far described, it is pointed out that while the actual point of trailer hitch attachment to hitch 10 will be either at the ball 84 or housing 88 just rearwardly of vehicle 14 at the conventional location for such devices, such hitch points are not fixed to the towing vehicle as presently done but are a part of the hitch arm or tongue 46 which at the rear portion of the vehicle is pivotally attached to the laterally slidable collar 38 and at its forward end is longitudinally slidable within sleeve 50 that in turn is pivotally connected to frame rail 20 just behind the rear axle 16 of vehicle 14. With the force of pull transmitted through frame 12 to shaft 34, collar 38 is centered for straight travel as seen in FIG. 2 but in a turn, slides on shaft 34 to right or left depending upon the direction of turning to correspondingly swing tongue 46 as seen in FIG. 3 which at its rearward portion pivots on pin 56 as collar 38 slides and at its forward end, slides longitudinally in sleeve 50 which in turn pivots at point 52. The limits of such swing at each side of center are defined by certain assemblies 96 and 98 providing stops and locking means which are of like construction so that assembly 96 will be described in detail and like numbers given to like parts for assembly 98.

With reference more particularly to FIGs. 2, 3, 5 and 6, assembly 96 is mounted on the rear rail 22 substantially adjacent that portion of shaft 34 covered by member 44 as seen in FIG. 2 and includes a pressure bar 100 having for purposes of description a far end 102 and a near end 104 relative to the longitudinal center of rail 22 which corresponds with the rear lateral center of vehicle 14. The far end 102 has an oversized opening 106 relative to the nut and bolt unit 108 by which it is loosely attached to rail 22 so as to afford a limited amount of vertical movement. Intermediate ends 102 and 104, bar 100 has a second oversized hole 110 relative to a headed threaded shank 112 that is vertically disposed so as to extend through hole 110 into threaded attachment in plate or rail 22. Journalled on shank 112 so as to bear against the top of plate 100 and the shank head 114 is the compression spring 116 normally urging plate 110 into contact with rail 22. Slightly spaced from the near end 104 of plate 100 there is a threaded stud bolt 118 arranged so that it projects from the bottom of plate 100 and normally terminates within a registering hole 120 in rail 22. End 104 of plate 100 is notched relative to the rear edge of rail 22 to provide the shoulder or stop 122 as best seen in FIG. 2 and thus described, hitch 10 is used and operated as follows.

OPERATION

With frame 12 secured to the towing vehicle 14 as described, the normal position of the tongue 46 and the point of attachment for the trailer 82 represented by the ball 84 or tube 88 is shown in FIG. 2 where it can be seen that while members 84 and 88 are centrally located relative to the lateral extremities of vehicle 14 at the rear similarly to the position of conventional hitches, such hitch or coupling points for the trailer 82 are not fixedly anchored to the vehicles as are the conventional counterparts since they are laterally movable with tongue 46 as seen in FIG. 3 and, as seen in FIG. 4, are normally locked in longitudinal alignment with tongue 46 by the engagement of balls 80 and 85 between sector 66 and tongue extension 54.

As vehicle 14 is moved forwardly, the pulling force is transmitted through frame 12 and to shaft 34 with tongue 46 securely but pivotally anchored to collar 38 by the pin 56 so that trailer 82 is pulled as is obvious. Turning movements will be described relative to a left turn and it will be understood that the operation referred to is the same in the opposite direction. For straightaway travel, the position of the locking and stop assembly 96 is shown in FIG. 5 where the pressure bar 100 is in juxtaposition with the top of the rear rail 22 under pressure of spring 116. As vehicle 14 turns to the left, tongue 46 and collar 38 likewise swing to the left as seen in the solid lines of FIG. 3 whereby roller wheel 62 traverses the rear longitudinal edge portion of the rear rail 22 and is held in alignment with such rail by the engagement of ear 60 against the rear edge of the same. In this movement, the sector plate 66 with balls 80 and 85 in locked position is also sliding to the left relative to rail 22 and with tongue 46 pivotally anchored to collar 38 by pin 56, the forward end of the tongue slides rearwardly relative to the pivoting sleeve 50 for obvious reasons. Collar 38 will compress the coverings 44 in its lateral movement on shaft 34 and the limit of the lateral swing of tongue 46 is reached when the roller wheel 62 abuts the shoulder 122. As this point is reached, ball 80 will contact the bottom of the stud bolt 118 (FIG. 6) so as to raise bar 100 against spring 116 and permit ball 80 to move out of socket 74 in the sector plate 66 due to spring means 76 and partially through opening 58 in tongue extension 54 and into opening 120 in rail 22 in contact with stud 118 whereby the locking effect of ball 80 is transferred from sector 66 and tongue 46 to tongue 46 and rail 22 and a continued turning force on plate 66 will move ball 85 into hole 83 so that sector 66 is free to further pivot at end 68, if required, and to correspondingly effect further pivoting of members 84 and 88 to expedite maneuverability in tight places as seen in FIG. 3. As the turning action is completed, the return to straightaway travel realigns sector 66 and as the tongue 46 moves towards center out of engagement with assembly 96, balls 80 and 85 return to their respective locking positions.

From the foregoing operation it will be appreciated that a direct line of pull to hitch points 84 and 88 through tongue 46 attached to collar 38 for straightaway travel as seen in FIG. 2 is also maintained in a turn by the sliding of collar 38 as described to correspondingly realign the relative position of the actual point of trailer attachment at either ball 84 or housing 88. This provides an improved balance and control and minimizes trailer sway and fish-tailing. The supplementary or additional turning of sector 66 after it has reached the lateral limits of tongue 46 movement makes it possible in close quarters to maneuver the trailer to a position of 90° relative to vehicle 14 without damaging the hitch or the two vehicles. Accordingly, from all of the foregoing, it is thought that a full understanding of the construction and operation of this trailer hitch will be had and it many advantages appreciated.

I claim:

1. A trailer hitch for attachment to a towing vehicle, said hitch comprising:

a hitch frame secured to the underside of the vehicle at the rear thereof with said hitch frame including a rear rail in juxtaposition to the rear extremity of the vehicle and disposed transversely of the direction of forward vehicle travel, an elongated tongue having a forward and rear end, means for pivotally securing the forward end of said tongue to said hitch frame forwardly of the rear end of said vehicle so that the rear end of said tongue extends rearwardly beyond the rear extremity of the vehicle and can swing laterally in two opposite directions relative to the rear of the vehicle, means slidable on said hitch frame adjacent said rear rail and operatively connected to said tongue to guide said tongue in its lateral swing movements, a plate disposed at the underside of the rear end of said tongue and pivotally secured at one end thereto, hitch means operatively secured to said plate so as to be movable therewith, releasable lock means operable relative to said tongue and said plate for normally maintaining said hitch means in longitudinal alignment with said tongue, lock actuating means on said rear rail at spaced points thereon at opposite sides relative to the center line of the towing vehicle whereby in the swing movement of said tongue said releasable lock means is engageable with and acted upon by said lock actuating means to release the same so that said plate is pivoted to effect the pivotal movement of said hitch means out of longitudinal alignment with said tongue, and means on said rear rail cooperating with said releasable lock means to effect the transfer of its interlocking effect between said tongue and said plate to interlocking engagement between said tongue and said rear rail.

2. A trailer hitch as defined in claim 1, including:

respective stop means on said rear rail at spaced points thereon at opposite sides relative to the center line of the towing vehicle, and means associated with said tongue and engageable with said respective stop means to limit the distance of swing of said tongue away from its normal position.

3. A trailer hitch as defined in claim 1 wherein said means on said hitch frame operatively connected to said tongue, comprises:

a shaft mounted on said hitch frame adjacent and parallel to said rear rail, a collar slidably journalled on said shaft, said tongue being disposed transversely of said collar and in abutment therewith, and means pivotally connecting said tongue to said collar at the point of abutment for movement therewith.

4. A trailer hitch as defined in claim 1 wherein said means for pivotally securing said tongue to said support point comprises:

an elongated sleeve pivotally secured at one end to said support point, and said one end of said tongue being telescopically journalled in the other end of said sleeve.

5. A trailer hitch as defined in claim 1 including:

said tongue being provided with a through hole normally in registration with the underside of said rear rail, said plate being provided at its other end with a socket normally in registration with the through hole in said tongue, a steel ball seated in said socket so as to extend into said hole and interlock said plate and tongue against relative movement whereby said hitch means is maintained in longitudinal alignment with said tongue, spring means in said socket for acting against said ball, said rear rail being provided with respective holes at opposite sides relative to the longitudinal center line of the towing vehicle, a respective spring loaded yieldable pressure bar on said rear rail in registration with and operable relative to the respective holes therein, and the lateral swing movement of said tongue bringing said steel ball into registration with a respective hole in said rear rail whereby said ball moves out of said socket and becomes engaged both in the hole in said tongue and a hole in said rear rail and against said pressure bar to interlock said tongue and rear rail and permit said plate to pivot so as to close the hole in said tongue below said ball and correspondingly move said hitch means out of longitudinal alignment with said tongue.

* * * * *